(12) United States Patent
Sidambarom et al.

(10) Patent No.: US 10,829,220 B2
(45) Date of Patent: Nov. 10, 2020

(54) AIRCRAFT CABIN MANAGEMENT SYSTEM

(71) Applicant: Safran Seats, Plaisir (FR)

(72) Inventors: Michael Sidambarom, Issoudun (FR); Jean-Marc Obadia, Issoudun (FR)

(73) Assignee: Safran Seats, Plaisir (FR)

( * ) Notice: Subject to any disclaimer, the term of this patent is extended or adjusted under 35 U.S.C. 154(b) by 226 days.

(21) Appl. No.: 15/773,073

(22) PCT Filed: Apr. 5, 2016

(86) PCT No.: PCT/EP2016/057450
§ 371 (c)(1),
(2) Date: May 2, 2018

(87) PCT Pub. No.: WO2017/076518
PCT Pub. Date: May 11, 2017

(65) Prior Publication Data
US 2018/0319503 A1    Nov. 8, 2018

(30) Foreign Application Priority Data

Nov. 4, 2015  (EP) .................................. 15193042

(51) Int. Cl.
*B64D 11/06* (2006.01)
*B60N 2/00* (2006.01)
*B60N 2/02* (2006.01)
*B64D 11/00* (2006.01)

(52) U.S. Cl.
CPC .............. *B64D 11/06* (2013.01); *B60N 2/002* (2013.01); *B60N 2/0224* (2013.01); *B60N 2/0244* (2013.01); *B64D 11/00155* (2014.12); *B60N 2002/0272* (2013.01)

(58) Field of Classification Search
CPC .............................. B64D 11/06; B64D 11/062
See application file for complete search history.

(56) References Cited

U.S. PATENT DOCUMENTS

| 5,751,129 A | 5/1998 | Vergin |
| 6,929,218 B1 * | 8/2005 | Sanford ........... B64D 11/00155 244/118.5 |
| 2006/0075934 A1 * | 4/2006 | Ram ...................... B60N 3/004 108/44 |

FOREIGN PATENT DOCUMENTS

| EP | 2546145 | 1/2013 | |
| EP | 2881325 A1 * | 6/2015 | ......... B64D 11/0638 |
| WO | 1997028989 | 8/1997 | |
| WO | 2006010702 | 2/2006 | |

(Continued)

OTHER PUBLICATIONS

International Patent Application No. PCT/EP2016/057450, International Search Report and Written Opinion, dated Jun. 22, 2016.

(Continued)

*Primary Examiner* — Richard G Davis
(74) *Attorney, Agent, or Firm* — Kilpatrick Townsend & Stockton LLP

(57) ABSTRACT

An aircraft cabin management system includes a control unit and at least one sensor intended to be incorporated into a seat and suitable for establishing a communication with the control unit in order to transmit, to the control unit, at least one signal relating to at least one measurement performed by the sensor.

15 Claims, 2 Drawing Sheets

(56) References Cited

FOREIGN PATENT DOCUMENTS

WO        2008036539        3/2008

OTHER PUBLICATIONS

International Patent Application No. PCT/EP2016/057450, Written Opinion of the International Searching Authority (including English translation), dated Jun. 22, 2016.

* cited by examiner

AIRCRAFT CABIN MANAGEMENT SYSTEM

CROSS-REFERENCE TO RELATED APPLICATIONS

This application is a national phase entry under 35 USC § 371 of International Patent Application No. PCT/EP2016/057450 ("the '450 application"), filed Apr. 5, 2016, and entitled AIRCRAFT CABIN MANAGEMENT SYSTEM, which claims priority to and benefits of Europe Patent Application No. 15193042.7 ("the '427 application"), filed on Nov. 4, 2015, and entitled CONNECTED AIRCRAFT SEAT. The '450 application and the '427 applications are hereby incorporated in their entireties by this reference.

FIELD OF THE INVENTION

The present invention relates to an aircraft cabin management system.

BACKGROUND

Typically, the crew onboard must make several checks before takeoff and landing of an aircraft in order to ensure that all passenger seats are in a suitable functional position, called the "taxi-take-off-landing" (TTL) position. Members of the crew onboard must thus verify, in particular, that all seat elements are in the correct position: the belt is fastened, the tray and back are in the raised position, and the arms are lowered. These checks take a long time to do and are likely to lead to errors since they are performed by a human.

In terms of maintenance, the car must be inspected regularly to detect any malfunctions. Some seat problems are not readily visible to the naked eye and require functional tests that can take time to carry out.

In addition, when not detected or when detected later by maintenance crews, the cabin crew, or—in the worst case—by the passenger, a problem can lead passenger dissatisfaction, a bad image for the airline, or excessive maintenance time since the replacement of the part could not be anticipated.

Moreover, the passenger must always adjust the seat to their preferences: seat position, seat height, seat firmness, lighting, seat temperature, etc., and must also constantly restate their preferences in movies, music, or food and beverages, which is tedious especially for travelers who frequently travel by plane.

SUMMARY OF THE INVENTION

The invention aims to effectively remedy at least one of the aforementioned drawbacks by proposing an aircraft cabin management system, characterized by comprising:
 a control unit, and
 at least one sensor intended to be incorporated into a seat and suitable for establishing a communication with the control unit in order to transmit, to the control unit, at least one signal relating to at least one measurement performed by the sensor.

Due to the seat sensors in relation to the cabin management system, the invention makes it possible to automatically detect, without intervention by the cabin crew, the adjusted positioning of the seat before takeoff or landing of the aircraft, and/or a malfunction of the seat or a corresponding member as soon as the malfunction occurs or even before. The invention can also adapt the configuration of the seat according to preferences of the passenger, whose identity has been detected at the time of arrival.

According to one embodiment, the sensor is suitable for establishing communication with the control unit via a wireless link.

According to one embodiment, the sensor is provided with an energy collection system.

According to one embodiment, a passenger identification device can be used to configure the seat and/or a multimedia system according to preferences associated with the passenger.

According to one embodiment, the preferences are defined by the passenger and/or recorded automatically from the settings made on other flights.

According to one embodiment, the identification device is constituted of a mobile communication terminal and/or an electronic card reader.

According to one embodiment, the passenger preferences are defined by at least one item of information from the group consisting of a seat position, a seat firmness, lighting, a seat temperature, an olfactory setting, and an item of information about movie, music, food, and/or beverage preferences.

According to one embodiment, the system comprises a set of sensors suitable for detecting an operational seat position setting prior to aircraft takeoff and/or landing.

According to one embodiment, when a seat positioning problem is detected, a corresponding alert signal containing at least one item of information on the seat position in the aircraft cabin can be transmitted to the control unit.

According to one embodiment, when a seat positioning problem is detected, an error message is displayed on a screen of a multimedia system associated with the seat.

According to one embodiment, the system comprises:
 at least one sensor for sensing the presence of a passenger on the seat, and/or
 at least one sensor for sensing the position of a tray associated with the seat, and/or
 at least one position sensor located on a seatbelt of the seat, and/or
 at least one sensor for sensing the position of a seatback of the seat.

According to one embodiment, the system comprises a set of sensors suitable for detecting and/or predicting a malfunction and/or excessive wear on a constituent or structural element of the seat.

According to one embodiment, when a problem is detected, an alert signal containing at least one item of information on the position of the seat in the aircraft cabin can be transmitted to the control unit and/or to a maintenance service server.

According to one embodiment, the system comprises a sensor for measuring the thickness of a seat cushion, in particular, coupled to a weight gauge. This makes it possible to determine if the cushion is able to provide a level of comfort acceptable to the passenger. However, it is possible to not use the measurement of weight if it is measured that the cushion returns at least once within a specified time (for example, once a day) to the original position thereof within a predetermined margin of error, making it possible to determine that comfort function is always guaranteed.

According to one embodiment, the system also comprises a load sensor that is integrated into the seat, in particular, in a constituent and/or structural element of the seat. This makes it possible to detect an excessive load applied to one of the elements of the seat and/or to detect a number of cycles of use.

According to one embodiment, the system comprises a shock sensor integrated into the seat, in particular, into a seat structure. This makes it possible, for example, to detect the shocks of trolleys circulating in the aisles of the cabin.

According to one embodiment, the system comprises a load sensor integrated into the seat, in particular, a retractable accessory of the seat. This makes it possible to detect an overload due to deterioration of the guidance system thereof for passing from a deployed position to a stowed position, or the application of excessive efforts on the corresponding accessory.

According to one embodiment, the load sensor is integrated into an arm of a tray, or into an articulation of a screen of a multimedia system.

According to one embodiment, the system comprises a sensor for measuring environmental parameters such as temperature, vibrations, or humidity. Such a sensor makes it possible to anticipate early wear on the elements of the seat and any corrosion thereof.

It shall be readily understood that the different characteristics, variants, and/or embodiments of the prevent invention may be associated with one another according to various combinations insofar as they are not incompatible with one another or mutually exclusive.

BRIEF DESCRIPTION OF THE DRAWINGS

The present invention shall be better understood and other characteristics and advantages shall be made more apparent by a reading of the following detailed description, which includes embodiments presented by way of illustrative example with reference to the accompanying drawings, presented as non-limiting examples, which may serve to enhance understanding of the present invention and the presentation of the embodiment thereof, and, where applicable, to contribute to defining same.

DETAILED DESCRIPTION

Figure 1:
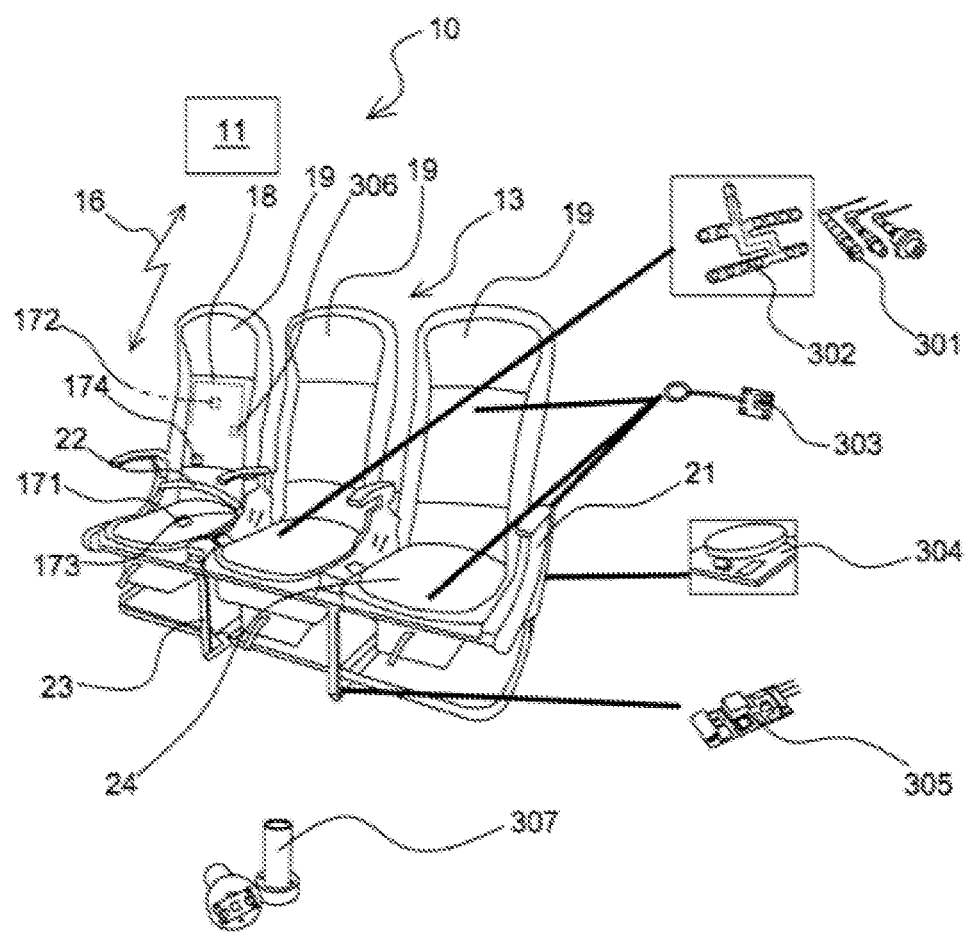
FIG. 1 illustrates a perspective view of a seat showing the integration of the sensors belonging to the management system according to the present invention.

It shall be noted that in the drawings, structural and/or functional elements that are common to different embodiments may bear the same reference signs. Thus, unless otherwise stated, such elements have identical structural, dimensional, and material properties.

FIG. 1 illustrates an aircraft cabin management system 10 comprising a control unit 11 and at least one sensor, advantageously a plurality of sensors 171-174 and 301-307, integrated into a seat 13. The sensor is able to establish communication with the control unit 11 in order to transmit, to the control unit 11, at least one signal pertaining to at least one measurement conducted by the sensor, as shall be explained in greater detail hereinbelow.

According to one particular embodiment, the seat 13 may comprise, in particular, a belt 22, a tray 18, a seatback 19, and at least one armrest 21.

The communication between the sensor and the control unit 11 is performed preferably by a wireless link 16, for example, a Wi-Fi or Bluetooth link, or an infrared link. Alternatively, the communication between the sensor and the control unit 11 may be conducted via a wired connection.

Advantageously, the sensor is provided with an internal energy collection device, in particular, an energy collection system, so as to remove the need to be powered by an external energy source in order to function. The sensor may be configured in order to run, for example, on electromagnetic energy, mechanical energy (for example, from vibrations), thermal energy (for example, from heat), light energy, or the like. The sensor may be passive or active, depending on the measurement to be performed.

Specifically, according to one particular embodiment, the sensors used include a set of sensors 171-174 able to detect adjustment of the operational position of the seat 13 before takeoff or during aircraft landing. The operation position to be detected is the "taxi, takeoff, landing" (TTL) position, in which at least the belt 22 must be buckled, the tray 18 and the seatback 19 must be in the upright position, and the armrests 21 must be lowered.

For this purpose, a sensor 171 for sensing the presence of the passenger on the seat 13 is implanted into the seat 13, in particular, in a seat bottom 24 of the seat 13. The presence sensor 171 may, for example, take the form of a pressure sensor or a position switch.

A position sensor 172 is able to detect the upright position of the tray 18 of the seat 13. FIG. 1 depicts the position sensor 172 and the tray 18 in dotted lines, because they are located on a backside of the seat 13, in particular, on a backside of the seatback 19.

Moreover, another position sensor 173 is located on the seatbelt 22 and makes it possible to detect when the seatbelt 22 is buckled. Another position sensor 174 makes it possible to detect the position of the seatback 19 of the seat 13.

The position sensors 172, 173, and 174 may take the form of capacitive or resistive sensors, or contact sensors. They may be identical or different.

In the embodiment in FIG. 1, all of the sensors 171-174 are integrated for each individual person's seat in the seat 13, which, according to the variant presented, comprises places for three people. The seat 13 therefore comprises, more generally, a number of sensors, equal to at least one, that is suitable for a seat 13 encompassing a single person's seat.

Figure 2:
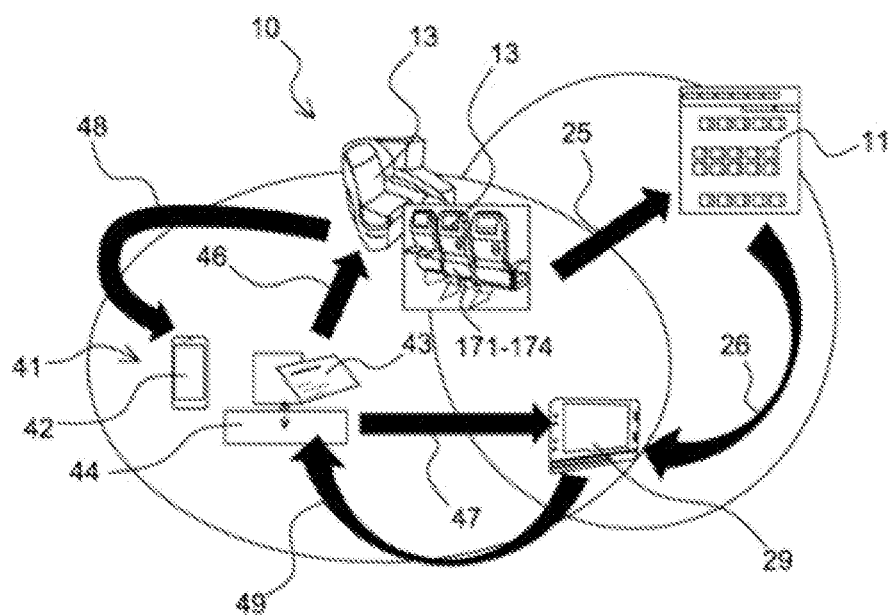
FIG. 2 is a diagram illustrating the functionality for detecting the functional positions of the seat, as well as the functionality for managing passenger preferences, that are implemented by the management system according to the present invention.

As is clearly visible in FIG. 2, when a problem in the positioning of one of the parts of the seat 13 is detected, a corresponding alert signal 25, preferably also containing information on the position of the seat 13 in the aircraft cabin, can be transmitted to the control unit 11.

The alert signal corresponds to the identification of a state and association, for example, with a threshold value. Comparing the value returned by the sensor with the threshold value makes it possible to generate the information on the threshold crossing. The sensors may either send a state and/or position signal that is not analyzed (i.e., a measurement signal that is not compared with a threshold value), or send information taken, for example, from analysis on the measurement signal relative to a corresponding threshold value.

A screen of the control unit 11 may then display the placement of the seat 13 on the basis of the information on the position of the seat 13 in the aircraft cabin. Thus, a member of the cabin crew can act quickly to remedy the problem detected and place the seat 13 back in the TTL position before the aircraft takes off or lands.

According to one embodiment variant, when a problem with positioning of the seat 13 is detected, an error message 26 may, in addition, be displayed on a multimedia system 29 (an in-flight entertainment (IFE) system) if the aircraft cabin is equipped with such a multimedia system 29. This thus allows the passenger to rectify only the problem of which he is notified, without needing to involve a member of the cabin crew.

Alternatively, or in addition, the management system 10 comprises at least one other sensor, advantageously another set of sensors 301-307, able to detect or predict a malfunction or excessive wear on an element of the seat 13. Such a sensor is of particular interest when one of the members has reached a maximum number of cycles of use.

In this case, a measurement sensor 301 is used, which sensor is able to determine a thickness of a seat cushion 24 and may, for example, take the form of a capacitive distance sensor or a position switch that establishes a contact when the seat cushion 24 is at an initial position and up to a fixed threshold.

According to one embodiment variant, the sensor 301 for measuring the thickness of the seat cushion 24 may be coupled to a weight gauge 302. Such a design makes it possible to determine if the seat cushion 24 is able to provide a level of comfort acceptable to the passenger.

However, it is possible to not use the measurement of weight if it is measured that the seat cushion 24 returns at least once within a specified time (for example, once a day) to the original position thereof within a predetermined margin of error, making it possible to determine that the comfort function is always guaranteed.

According to another embodiment variant, the sensor 301 for measuring the thickness of the seat cushion 24 may be coupled to a time counter in order to determine if the cushion returns to the initial state thereof after a predetermined length of time. Otherwise, this is an indicator of a loss of performance of the seat 13.

At least one load sensor 303 may also be integrated into the seat 13, in particular, in the seat bottom 24 and/or the seatback 19 and/or the armrest 21 of the seat 13.

The load sensor 303 may, for example, be constituted of a system composed of a calibrated spring and a contact that is triggered when the spring is deformed. This makes it possible to detect an excessive load applied to the seat 13, in particular, to the seat bottom 24 and/or the seatback 19 and/or the armrest 21 of the seat 13, and/or to detect a number of cycles of use.

At least one shock sensor 304 may also be integrated into the seat 13, in particular, into a seat structure 23. The shock sensor 304 is able to detect, in particular, shocks to the seat 13 and/or the seat structure 23, for example, from trolleys circulating in the cabin.

The shock sensor 304 may, for example, take the form of an accelerometer, a tilt sensor, or a piezoelectric sensor that measures deformation.

At least one vibration sensor 305 may also be integrated into the seat 13. The vibration sensor 305 is able to detect, in particular, a problem in mounting clearance in the seat structure 23.

Alternatively, the shock sensor 304 may, as appropriate, provide a function identical to that of the vibration sensor 305.

Moreover, the seat 13 may comprise one or more retractable accessories. In such a design, the retractable accessory of the seat 13 may be equipped with a load sensor 306. The load sensor 306 is able to detect an overload, in particular, due to deterioration of a system for guiding the retractable accessory for passing from a deployed position to a stowed position, or the application of excessive efforts. The load sensor 306 may thus be integrated into an arm of a tray or in an articulation of a screen of the multimedia system 29, in particular, placed in an armrest.

Furthermore, in order to anticipate early wear on a constituent and/or structural element of the seat 13 and/or any possible corrosion thereof, it is possible to provide a sensor 307 for measuring environmental parameters, such as temperature and/or vibrations and/or humidity inside the aircraft cabin.

Figure 3:
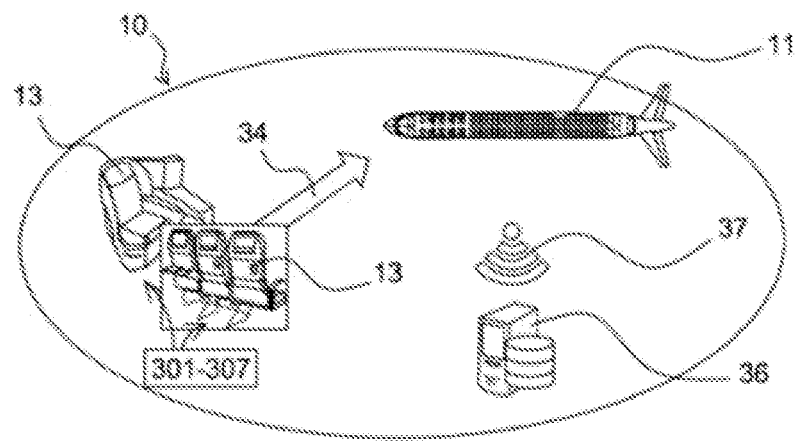
FIG. 3 is a diagram illustrating the functionality for managing maintenance implemented by the management system according to the present invention.

As is clearly visible in FIG. 3, when a problem is detected on one of the constituent and/or structural elements of the seat 13, that is to say, when one of the constituent and/or structural elements has, for example, a malfunction or has reached a limit number of cycles of use, an alert signal 34 containing, in particular, information on the position of the seat 13 in the aircraft cabin is transmitted to the control unit 11 and/or to a server 36 of a maintenance service.

The communication of data to the server 36 may be performed by the control unit 11 via a link 37 that is established via a dedicated network or via the network. The server 36 can be located in the aircraft or on the ground. This may be the server 36 of the airline and/or of the aircraft manufacturer and/or of the seat manufacturer.

It should be noted that the measurement data generated by the sensor—in particular, the measurement sensor 301, the weight gauge 302, the load sensor 303, the shock sensor 304, the vibration sensor 305, the load sensor 306—may be extracted by means of a dedicated system. The analysis of the raw data from the sensor may be performed at several levels, that is to say, at the sensor, integrating, for example, a memory containing the measurement data to be extracted, and/or at the level of the seat 13, for example, comprising a communication module centralizing all the measurement data generated by the sensor, and/or at the cabin level by means of the signals transmitted to the control unit 11 by the sensor or by the communication module, and/or at the level of the server 36 of the airline and/or the aircraft manufacturer and/or the seat manufacturer to which the measurement data of the different sensor is transmitted.

Moreover, as can be seen in FIG. 2, a device 41 for passenger identification is used in order to configure the seat 13 and/or the multimedia system 29, in particular, in accordance with preferences associated with the passenger.

The identification device 41 may be constituted of a mobile communication terminal 42 such as a mobile telephone or a connected bracelet, or an identifier reader 43, in particular, an electronic card reader 43. An identifier that can be read by the identifier reader 43 may take the form of a chip card or a magnetic card.

In the case of a mobile communication terminal 42, the passenger preferences may be stored directly in a memory of the mobile communication terminal 42.

In the case of an identifier reader 43 with limited storage capacity, merely the passenger identification may be stored on the identifier, which may, for example, take the form of a "frequently flyer" or loyalty card issued by the airlines.

A match is then established between the identifier and the parameters defining the travel preferences stored in a server 44 of the aircraft cabin management system 10.

According to this embodiment variant, a seat control unit 13 may then extract the data and use same to adapt the configuration of the seat 13 and of the multimedia system 29 accordingly. Transmission of the parameter data is schematically represented by the arrows 46 and 47 shown in FIG. 2.

Alternatively, it is possible to use another other means of identifying the passenger, such as biometric means, or voice recognition means.

In one embodiment, the passenger preferences are defined by at least one item of information from the group consisting of a seat position, a seat firmness, lighting, a seat temperature, an olfactory setting, and an item of information about movie, music, food, and/or beverage preferences.

The multimedia system 29 may also be configured to record the information on the movie, music, food, and/or drink preferences.

Advantageously, modifications to the passenger preferences are recorded in the memory of the mobile terminal 42 and/or in the memory of the server 44 of the aircraft cabin management system 10. Such a transmission of the update preference data is represented schematically by the arrows 48 and 49 shown in FIG. 2. These changes in preferences may also be transmitted to the server 36 of the airline.

Thus, the preferences are defined by the passenger or recorded automatically from the settings made on other flights.

Though the functionalities for detecting an operational position, managing maintenance, and managing preferences have been described in combination with one another, these functionalities may be implemented independently of one another. In other words, the aircraft cabin management system 10 may integrate the function for detecting the TTL position and/or the function for managing maintenance and/or the function for managing user preferences.

It shall be readily understood that the invention is not limited to the embodiments described herein, which are provided purely by way of example. It includes various modifications, alternative forms, and other variants that may be considered by a person skilled in the art in the context of the present invention and, in particular, all combinations of different modes of operation described above, which may be taken separately or in combination with one another.

The invention claimed is:

1. An aircraft cabin management system comprising:
    a control unit; and
    at least one sensor incorporable into a seat and configurable for establishing a communication with the control unit in order to transmit, to the control unit, at least one signal relating to at least one measurement performed by the at least one sensor,
    wherein the at least one sensor comprises a set of sensors, the set of sensors further comprising at least one of a sensor for measuring a thickness of a seat cushion or a load sensor, the set of sensors configurable for at least one of detecting or predicting a malfunction or excessive wear on an element of the seat by detecting at least one of that the element has reached a maximum number of cycles of use or that an excessive load has been applied to the seat.

2. The system of claim 1, wherein the at least one sensor is configurable for establishing communication with the control unit via a wireless link.

3. The system of claim 1, wherein the at least one sensor is provided with an energy collection system.

4. The system of claim 1, further comprising a passenger identification device configurable to configure at least one of the seat and a multimedia system according to passenger preferences.

5. The system of claim 4, wherein the passenger preferences are defined by at least one of a passenger and an automatically-created recording from settings made on other flights.

6. The system of claim 4, wherein the passenger identification device comprises at least one of a mobile communication terminal or an electronic card reader.

7. The system of claim 4, wherein the passenger preferences are defined by at least one item of information selected from the group consisting of a seat position, a seat firmness, lighting, a seat temperature, an olfactory setting, and an item of information that includes at least one of movie, music, food, or beverage preferences.

8. The system of claim 1, wherein the set of sensors are configurable to detect an operational position setting of the seat prior to at least one of aircraft takeoff or aircraft landing.

9. The system of claim 1, wherein, when a problem is detected, an alert signal comprising at least one item of information on a position of the seat in an aircraft cabin is transmittable to at least one of the control unit and a maintenance service server.

10. The system of claim 1, wherein the sensor is coupled to a weight gauge.

11. The system of claim 1, wherein the load sensor is integrated into the seat in at least one of a constituent or a structural element of the seat.

12. The system of claim 1, comprising a shock sensor integrated into a seat structure of the seat.

13. The system of claim 1, wherein the load sensor is integrated into a retractable accessory of the seat.

14. The system of claim 13, wherein the load sensor is integrated into at least one of an arm of a tray or an articulation of a screen of a multimedia system.

15. The system of claim 1, wherein the set of sensors further comprise a sensor for measuring environmental parameters comprising at least one of temperature, vibrations, or humidity.

* * * * *